United States Patent [19]
Deppa et al.

[11] Patent Number: 6,151,134
[45] Date of Patent: Nov. 21, 2000

[54] METHOD FOR HOST BASED PRINTING SYSTEM AND METHOD

[75] Inventors: Timothy W. Deppa, Cherry Hill; Donavan Harvey, Mt. Laurel, both of N.J.

[73] Assignee: Oki Data Americas, Inc., Mt. Laurel, N.J.

[21] Appl. No.: 08/832,662

[22] Filed: Apr. 4, 1997

Related U.S. Application Data

[62] Division of application No. 08/385,856, Feb. 9, 1995, Pat. No. 5,732,198.

[51] Int. Cl.[7] .................................................... G06F 15/00
[52] U.S. Cl. ........................................ 358/1.15; 358/1.18
[58] Field of Search ............................ 358/1.1, 1.9, 1.11, 358/1.13, 1.15, 1.17, 1.18, 401, 443, 501; 711/106, 165, 167, 171, 172, 212, 220, 221; 714/47, 702; 345/501, 520, 521, 526; 347/1, 2, 3, 184

[56] References Cited

U.S. PATENT DOCUMENTS

| | | | |
|---|---|---|---|
| 3,810,109 | 5/1974 | Morris et al. | 711/172 |
| 4,591,997 | 5/1986 | Grabel | 345/507 |
| 4,760,406 | 7/1988 | Sato et al. | 346/33 R |
| 4,849,883 | 7/1989 | Mitchell et al. | 358/1.1 |
| 5,047,995 | 9/1991 | Shope et al. | 367/125 |
| 5,146,544 | 9/1992 | Altham et al. | 358/1.16 |
| 5,150,454 | 9/1992 | Wood et al. | 358/1.15 |
| 5,157,761 | 10/1992 | Hawkes | 358/1.7 |
| 5,265,209 | 11/1993 | Kageyama et al. | 358/1.2 |
| 5,301,267 | 4/1994 | Hassett et al. | 345/469 |
| 5,303,334 | 4/1994 | Snyder et al. | 358/1.9 |
| 5,327,529 | 7/1994 | Fults et al. | 345/335 |
| 5,337,258 | 8/1994 | Dennis | 714/47 |
| 5,566,278 | 10/1996 | Patel et al. | 358/1.15 |
| 5,592,342 | 1/1997 | Hall et al. | 360/48 |

FOREIGN PATENT DOCUMENTS 0 421 779 A2  10/1991  European Pat. Off. .
0 574 224     12/1993  European Pat. Off. .

OTHER PUBLICATIONS

Flower, E., et al., *Library Software Review*, "A true multi-column report with dBase III+" (Jul.–Aug., 1987).
Plain, Stephen W., *Home Office Computing*, "Laser Printers Do Windows" (May 1994).
DP–TEK, Inc.,"Technologies For Multi–Function", 6 pages.
DP–TEK, Inc., "Alternatives to Microsoft Printing", 6 pages.
Hammond, P., *Computer Technology Review*, "Workstation Power Speeds Up Printing", vol. 12, No. 8 (Jul. 1992), p. 12.
Bertram et al., T., *Computer Technology Review*, "Print Rasterization Moves Hostward With Support From SCSI", vol. 12, No. 6 (May 1992), pp. 104–107.
Allen et al., J.W., *Hewlett–Packard Journal*, "HP Deskwriter C Printer Driver Development", vol. 43, No. 4, (Aug. 1992), pp. 93–102.

*Primary Examiner*—Dov Popovici
*Assistant Examiner*—Gabriel I. Garcia
*Attorney, Agent, or Firm*—Akin, Gump, Strauss, Hauer & Feld, L.L.P.

[57] ABSTRACT

A host based printing system for printing a page of a document. The system has a rasterized-image printing device for printing the page and a computer having a multi-tasking operating system. The computer includes an interface to the printing device, system memory, a resident computer application operated to produce system graphics resources data, a rasterizer rasterizing the data to produce bitmap data, a bitmap driver providing the rasterizer with printing device parameters, and a printing device interface (PDI). The PDI has a database, a print controller, and a port handler. The database has a page record for the page and a document record for the document, and the page record is updated when the page is output-ready. The print controller communicates with the database to determine whether a page is output-ready and locks at least a portion of the output-ready data for the page into physical memory. The port handler transfers the data to the printing device and receives messages from the printing device.

9 Claims, 7 Drawing Sheets

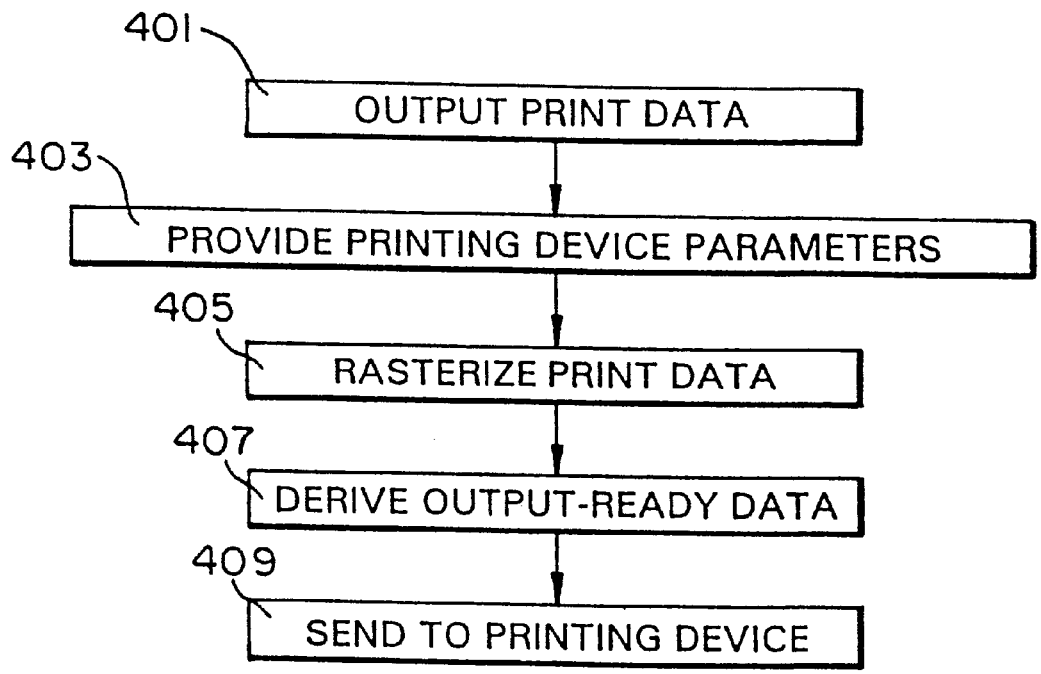
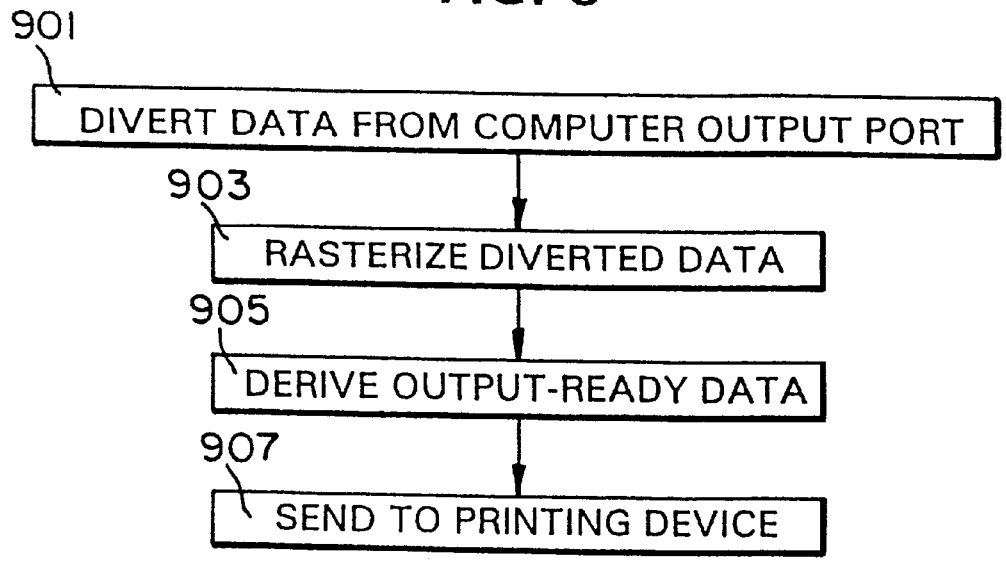

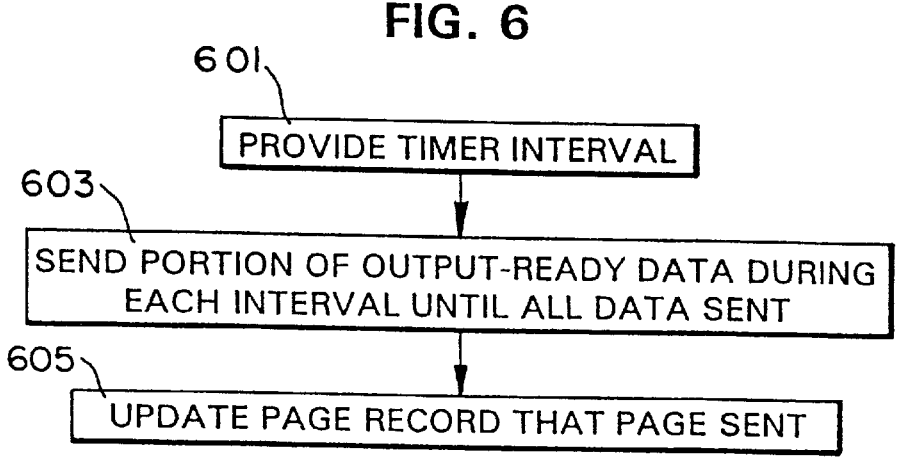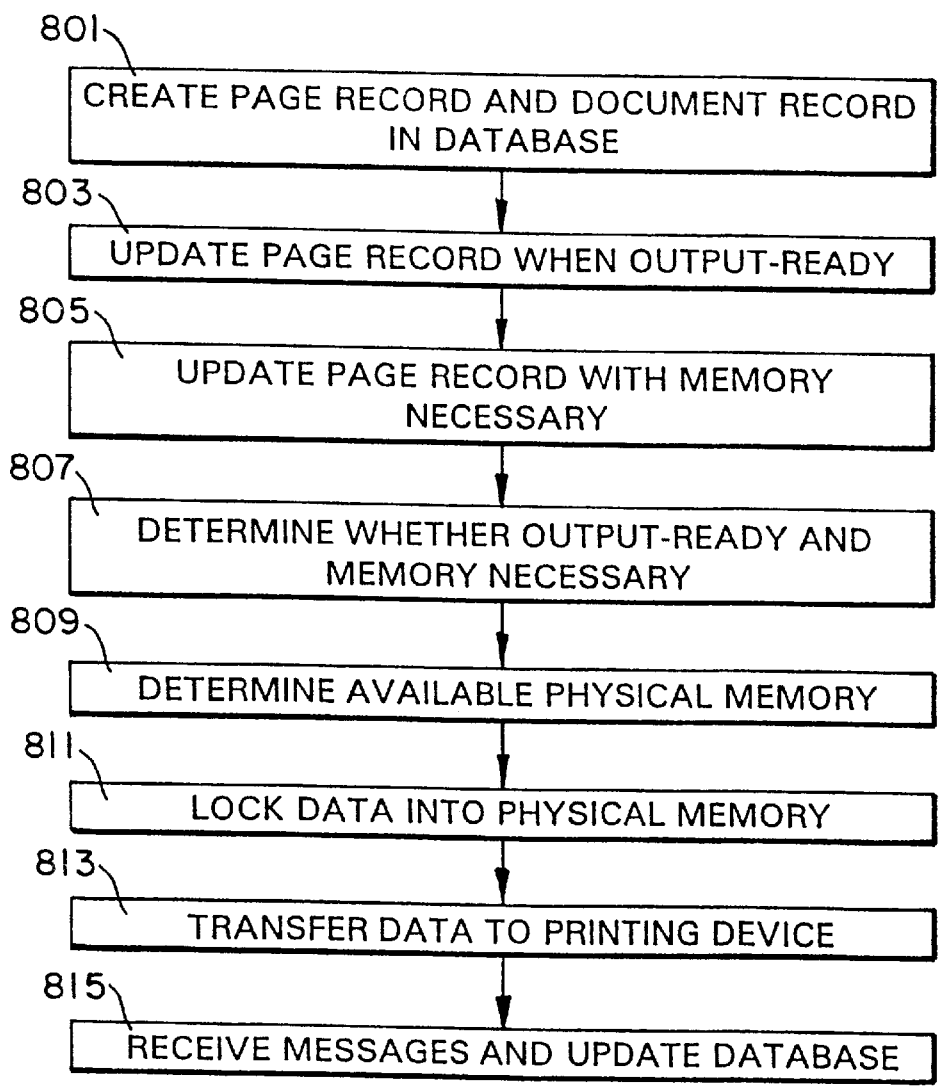

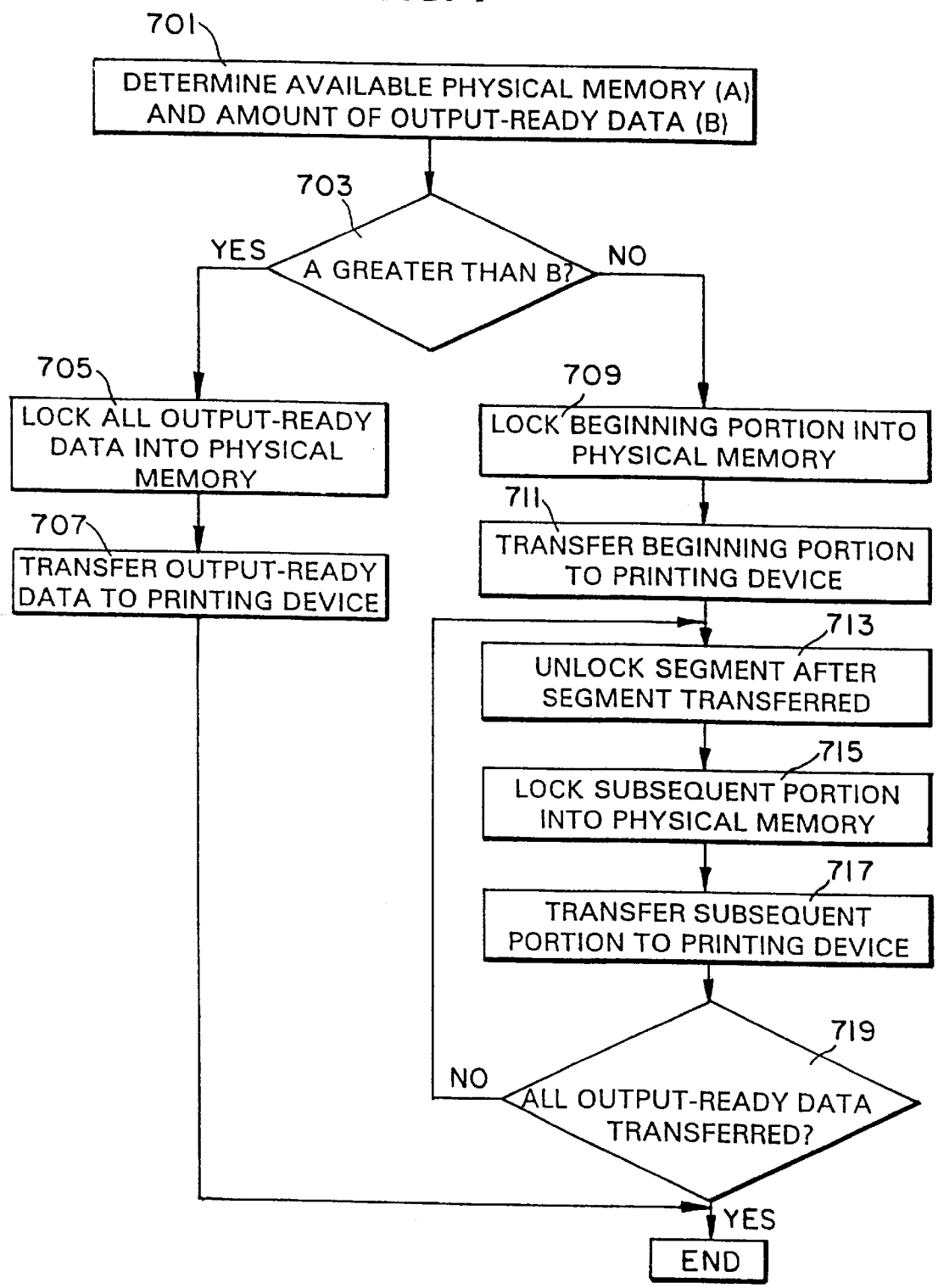

METHOD FOR HOST BASED PRINTING SYSTEM AND METHOD

This is a division of application Ser. No.08/385,856, filed Feb. 9, 1995 now U.S. Pat. No. 5,732,198.

FIELD OF THE INVENTION

The present invention relates generally to a system and method for printing data from a computer application running on a host computer. More particularly, the invention relates to a host based system and method used in connection with a multi-tasking operating system running on the host computer.

BACKGROUND OF THE INVENTION

As is known, many state-of-the-art printers employ print engines that receive encoded print data and that form print images from the print data pixel by pixel. At least with regard to laser and LED array print engines, it is generally understood that the printing of a page of information must be done in a generally continuous, uninterrupted manner, or a detectable interrupt mark will appear on the printed page.

Thus, it is well known to provide such a laser or LED array printer with a printer controller and an amount of printer random access memory (RAM), to produce print data at a host computer and encode the print data in a printer control language (PCL) or page description language (PDL), and to send the encoded print data from the host computer to the laser or LED array printer. Thereafter, the printer controller rasterizes the encoded print data and stores the rasterized data in the printer memory to be fed to the print engine as needed. As may be understood, though, the amount of printer memory must be relatively large to hold the relatively large amount of rasterized data needed such that the print engine does not run out of rasterized data partway through a page. Further, the printer controller must be relatively powerful to perform the rasterizing function and produce the relatively large amount of rasterized data at a relatively fast pace.

As will be recognized, the cost of such a powerful controller and of the amount of RAM necessary for such a laser or LED array printer may represent a significant portion of the total cost of the printer. Further, the controller and the memory in the printer may unnecessarily duplicate resources already available in the host computer.

A need exists, then, for a system and method whereby the resources available in the host computer are employed to prepare print data for printing by a rasterized data print engine, and whereby the printer having the print engine is simplified and economized. More particularly, a need exists for a host computer that rasterizes print data and delivers the rasterized data to the printer such that the printer requires a significantly reduced amount of memory and a much less powerful controller while ensuring that output-ready data is available to the print engine as needed for efficient full page printing.

SUMMARY OF THE INVENTION

The aforementioned need is satisfied by a host based printing system for printing a document having at least one page. The system has a rasterized-image printing device for printing the page and a computer having a multi-tasking operating system. The computer includes a high speed interface coupling the computer to the printing device, system memory, a resident computer application being operated in connection with the multi-tasking operating system to produce system graphics resources data, a rasterizer receiving system graphics resources data corresponding to the page from the computer application and rasterizing the data to produce bitmap data, a bitmap driver providing the rasterizer with printing device parameters, and a printing device interface (PDI) receiving print commands from the bitmap driver, retrieving output-ready data derived from the bitmap data from the system memory, and sending the retrieved output-ready data to the printing device.

The resident computer application and the rasterizer are operated in connection with the multi-tasking operating system, the computer application is caused to produce system graphics resources print data corresponding to the page, and the rasterizer is provided with the printing device parameters. Thereafter, the system graphics resources print data is rasterized in the rasterizer according to the printing device parameters to produce bitmap data for a page, and output-ready data is derived from the bitmap data. The printer device interface (PDI) is operated in connection with the multi-tasking operating system, and the output-ready data is sent to the printing device via the PDI.

The printing device interface (PDI) of the present invention has a database, a print controller, and a port handler. The database has a document record corresponding to each document and a page record corresponding to each page. The print controller communicates with the database to determine from the page record whether the page is output-ready and an amount of the system memory necessary to process the page, and also communicates with the system memory to determine the amount of available physical memory. When a page is output-ready, the print controller locks at least a portion of the output-ready data for the page into the available physical memory. The port handler transfers the data for the page in the physical memory to the printing device and receives messages from the printing device.

To print a document having a page, a page record corresponding to the page and a document record corresponding to the document are created in the database, and the page record is updated when the page is output-ready. Additionally, the page record is updated with an amount of the system memory necessary to process the output-ready data for the page. From the page record it is determined whether the page is output-ready, as well as the amount of the system memory necessary to process output-ready data corresponding to the page and the amount of available physical memory. Thereafter, the output-ready data is locked into the available physical memory and transferred to the printing device.

BRIEF DESCRIPTION OF THE DRAWINGS

The foregoing summary, as well as the following detailed description of preferred embodiments of the invention, will be better understood when read in conjunction with the appended drawings. For the purpose of illustrating the invention, there is shown in the drawings embodiments which are presently preferred. It should be understood, however, that the invention is not limited to the precise arrangements and instrumentalities shown. In the drawings:

FIGS. 4–10 are flow diagrams of the functions performed by the system and PDI of FIGS. 1 and 2.

DETAILED DESCRIPTION OF PREFERRED EMBODIMENTS

Figure 1:
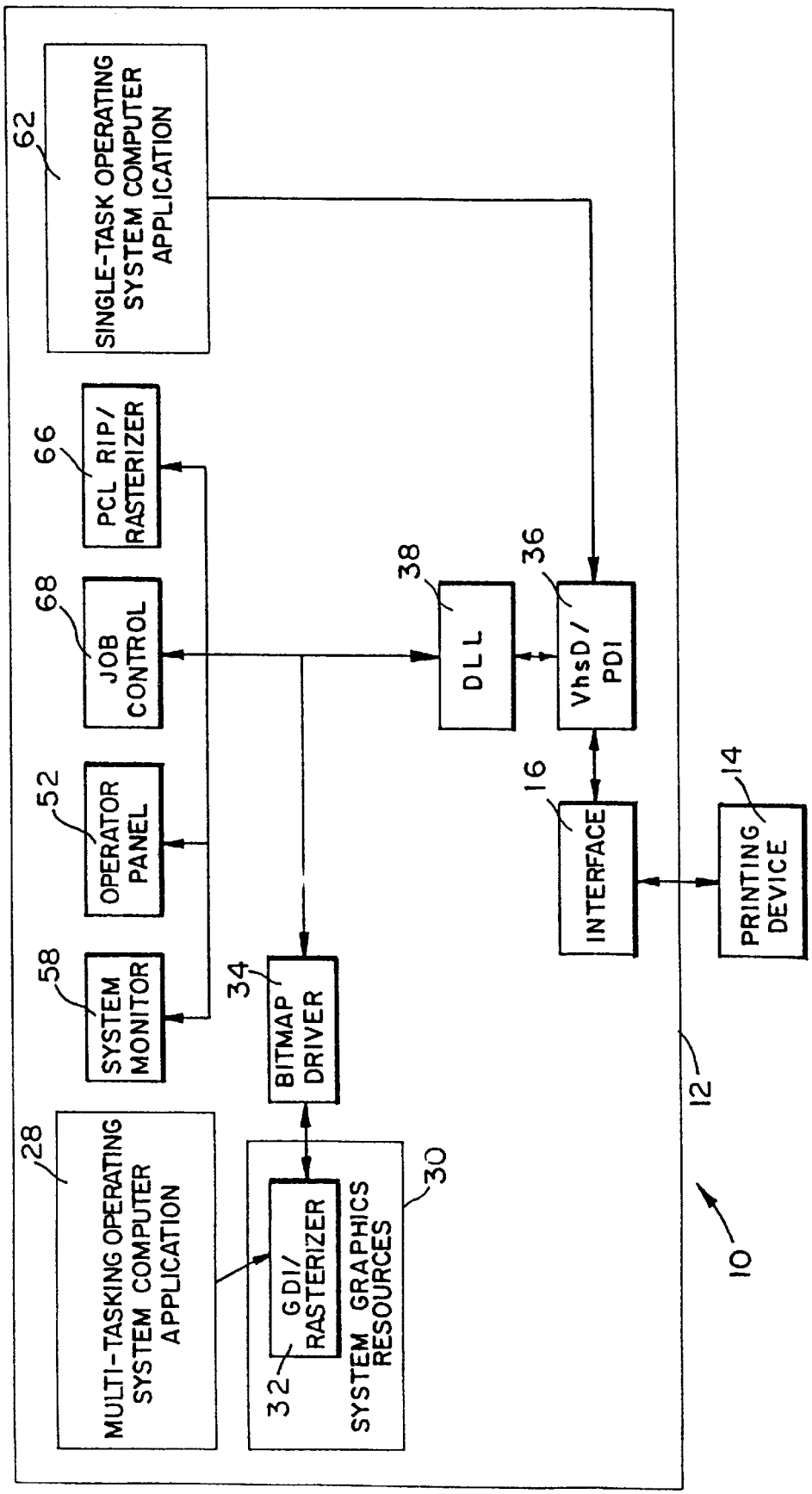
FIG. 1 is a schematic block diagram of a host based printing system in accordance with a preferred embodiment of the present invention.

Referring to the drawings in detail, wherein like numerals are used to indicate like elements throughout, there is shown in FIG. 1 a preferred embodiment of a host based printing system 10 for printing one or more documents, where each document has one or more pages. The system 10 is operated on a host computer 12 in connection with a multi-tasking operating system (not shown). The host computer 12 may be any type of computer, although the system 10 is primarily designed for use with a host computer 12 such as a personal computer (PC), a work-station, a local area network (LAN) or the like. As may be understood, a multi-tasking operating system allows the host computer 12 to perform multiple functions at the same time.

Examples of multi-tasking operating systems that may be employed in connection with the present invention include the "WINDOWS", "MACINTOSH", and "UNIX" operating systems, although one skilled in the art will recognize that the present invention may also be operated in conjunction with other multi-tasking operating systems. As should be understood, a multi-tasking operating system is necessary in connection with the system 10 so that printing functions can be accomplished by the host computer 12 while the host computer 12 is also performing other computing tasks.

As seen in FIG. 1, the system 10 includes a rasterized-image printing device 14 such as an LED array printer or laser printer for printing the one or more pages of information. An example of such a printing device 14 is the printer product produced by Okidata Corporation and preliminarily designated as the OL410eW. Preferably, the printing device 14 is constructed and programmed to receive pre-rasterized print data such that the printing device 14 need not rasterize print data itself. Accordingly, the printing device 14 may have a relatively small amount of memory, on the order of approximately 128 kilobytes, and a relatively simple controller such as an OKI NX-8 or an INTEL 8051 controller, since the rasterizing, which is both memory-intensive and power-intensive, is not performed by the printing device 14.

It will be recognized, however, that a larger amount of memory and/or a more powerful controller may be employed in the printing device 14 without departing from the spirit and scope of the present invention. Moreover, although the present invention accommodates laser and LED array print engines that must print a page of information in a generally continuous, uninterrupted manner, it will be recognized that the present invention may also accommodate a non-continuous print engine such as an ink-jet print engine or a pin print engine.

As should be understood, the printing device 14 has a plurality of associated printing device parameters. Such printing device parameters include, but are not limited to, the available printing resolution(s) of the printing device 14, usually expressed in dots per inch (DPI), the size(s) of paper available to the printing device 14, and the zone within a sheet of paper on which the printing device 14 prints, among other things. The printing device parameters are made available to the computer 12 for use by the system 10 in printing the one or more pages. Preferably, the printing device parameters are located in a data file (not shown) in the system 10. More preferably, the user selects the printing device parameters by way of an operator panel 52 associated with the system 10 and the computer 12 and the parameters are stored on a hard disk drive 22.

The computer 12 and the printing device 14 are communicatively coupled by way of a high speed interface 16. As should be understood, the computer 12 through the interface 16 must be able to deliver data to the printing device 14 fast enough so that data is available to the print engine within the printing device 14 as needed. Since the printing device 14 employed in the present invention need only have a relatively small amount of memory, data must be delivered to the printing device 14 at approximately the same rate at which the data is needed by the print engine.

Preferably, the interface 16 is a "CENTRONICS" or IEEE-1284 interface capable of being operated in the ECP (Enhanced Capabilities Port) mode. However, one skilled in the art will recognize that other high speed interfaces may be employed while still being within the spirit and scope of the present invention. Such other interfaces include but are not limited to the P1394 "FIREWIRE" interface and a video interface (not shown).

Figure 1A:
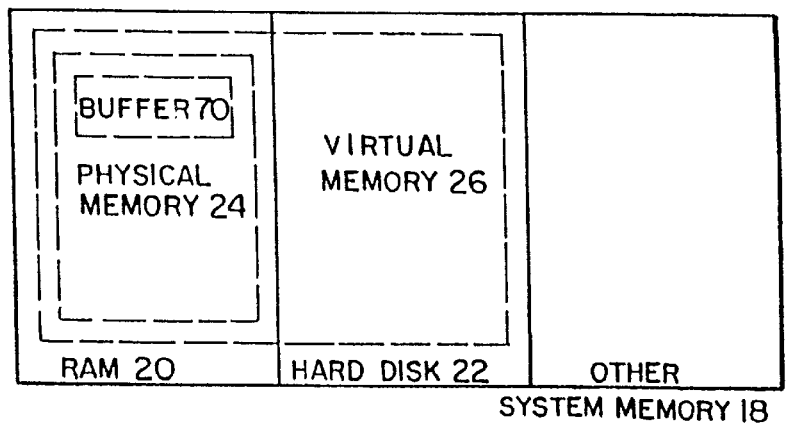
FIG. 1A is a schematic diagram showing a preferred layout of the system memory of the system shown in FIG. 1.
Figure 2:
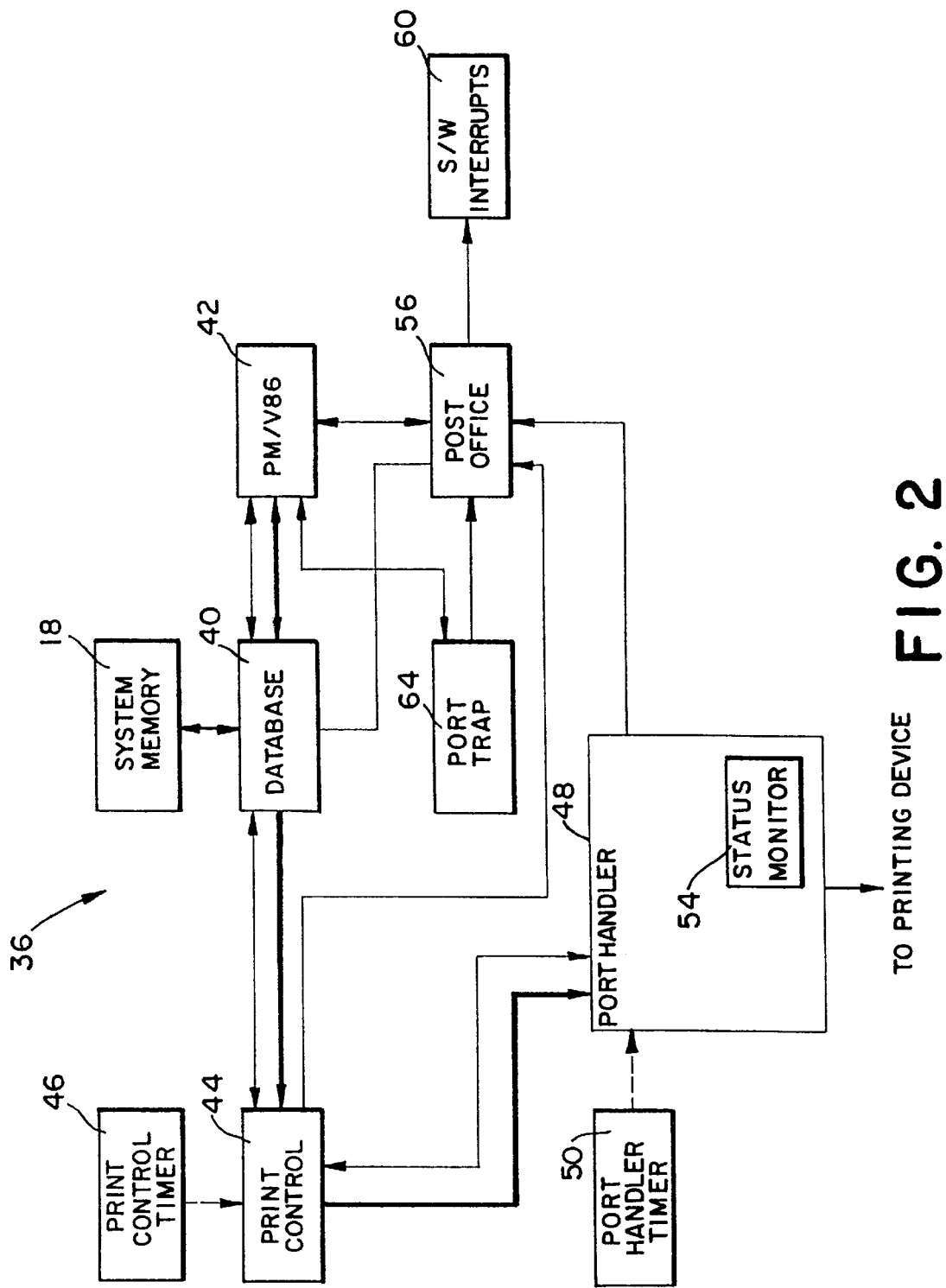
FIG. 2 is a schematic block diagram of a preferred embodiment of the printer device interface (PDI) of the system shown in FIG. 1.

As seen in FIGS. 1A and 2, the computer 12 has an amount of system memory 18. More particularly, and as seen in FIG. 1A, the system memory 18 is preferably comprised of storage devices that include random access memory (RAM) 20 and the hard disk drive 22, as well as other types of storage devices including but not limited to optical memory (not shown) and the like. The system memory 18 may be defined as including physical memory 24 and virtual memory 26. The distinction between physical and virtual memory 24, 26 is important since the system 10 typically requires some amount of faster physical memory 24 to reliably transfer data to the printing device 14.

As should be understood, virtual memory 26 may be defined as all system memory 18 available to the multi-tasking operating system as addressable memory. Accordingly, virtual memory 26 can include slower-access devices such as the hard disk drive 22 and faster-access memory devices such as the RAM 20. Physical memory 24 is a subset of the virtual memory 26, and may be defined as all virtual memory 26 made available by the multi-tasking operating system to hold data that is being processed. Thus, physical memory 24 can only include faster-access memory devices such as the RAM 20.

Accordingly, the multi-tasking operating system may move or "swap" a first portion of data into the physical memory 24 to perform an operation with the first portion, and then swap the first portion into the virtual memory 26 to create available physical memory 24 for performing an operation on a second portion of data. Preferably, to ensure the availability of some physical memory 24 for transferring data to the printing device 14, a portion of the physical memory 24 is reserved as a buffer 70 in the system memory 18.

To print a document having a number of pages of information, it is necessary that a resident computer application 28 be operated in connection with the multi-tasking operating system of the host computer 12. As should be recognized, the application 28 may be any of a plurality of types of applications, including word processing, drafting, spreadsheet, database, and entertainment applications, and the like. For example, if the "WINDOWS" operating system is employed in connection with the present invention, the computer application 28 may be the "WORDPERFECT FOR WINDOWS" word processing application.

As is generally understood, when the application 28 is commanded by a user to print one or more pages of information, the application 28 produces systems graphics resources data corresponding to each page. As should be understood, the systems graphics resources data includes but is not limited to fonts, bitmaps, colors, brushes, graphics primitives, and the like, as well as other information necessary for printing each page.

In response to the systems graphic resources data, the system 10 operates systems graphics resources 30. As may be understood, the systems graphics resources 30 includes character font sets, glyph sets, point tables, brushes, user defined graphic images, and a rasterizer 32. The rasterizer 32 may be a Graphics Device Interface (GDI) or any other rasterizer device that rasterizes the systems graphics resources data from the computer application 28 with the aid of the other systems graphics resources 30 to produce bitmap data for each page to be printed. As should be understood, the bitmap data represents the on and off states for each pixel in each pixel row of the rasterized page. The bitmap data produced by the rasterizer 32 is stored in the system memory 18 to await further processing. Rasterizers and methods for rasterizing are known and therefore need not be discussed in greater detail.

Referring again to FIG. 1, the system 10 has a bitmap driver 34 in communication with the rasterizer 32. The bitmap driver 34 provides the rasterizer 32 with context: information including the printing device parameters. Additionally, the bitmap driver 34 aids the rasterizer 32 by performing such functions as allocating system memory 18 for the bitmap data produced by the rasterizer 32 and by performing administrative functions. The administrative functions include but are not limited to assigning identifiers to the document and each page of the document, ascertaining whether enough system memory 18 is available to allow the rasterizer 32 to operate, and issuing a print command when a page is fully rasterized, among other things. As may be understood, the print command may be in the form of a close page command or the like.

The print command issued by the bitmap driver 34 is received by a Printing Device Interface (PDI) 36. Preferably, the PDI 36 is a virtual high speed driver (VhsD). As should be understood, a VhsD is a software device loaded into the system memory 18 to perform a high speed data processing function. Once loaded, the VhsD is considered to be another computing component within the computer 12. As should be understood, it is preferable that the PDI 36 be executed as a higher priority task by the multi-tasking operating system and that most if not all other elements in the system 10 be executed at a lower priority. Particularly with regard to the "WINDOWS" operating system, constructing the PDI 36 in the form of a VhsD ensures that the PDI 36 will be executed at the highest priority level. Accordingly, the operation of the PDI 36 is not generally interruptable.

Preferably, the bitmap driver 34 communicates with the PDI 36 by way of a Device Link Library (DLL) 38. Particularly with regard to the "WINDOWS" operating system, the DLL 38 is a known operating system component that is employed to channel communications between the PDI 36 and most components in communication with the PDI 36. If the system 10 is being operated in connection with an operating system other than the "WINDOWS" operating system, the DLL 38 may be unnecessary or may be replaced with an equivalent component, as the case may be. Since the structure and operation of the DLL 38 is generally known, no further discussion is necessary.

In response to the print command from the bitmap driver 34, the PDI 36 communicates with the system memory 18 to retrieve output-ready data for the page to be printed and sends the retrieved output-ready data to the printing device 14. The output-ready data for a page is derived from the At bitmap data produced by the rasterizer 32 for the page. Preferably, the output-ready data is derived by compressing the bitmap data for the page into compressed data and formatting the compressed data into the output-ready data. Accordingly, the output-ready data is in a form that can be sent to the printing device 14.

Preferably, the bitmap driver 34 retrieves the bitmap data from the virtual memory 26 and performs the compressing and formatting functions, and then stores the output-ready data in the system memory 18. However, it should be understood that the PDI 36 may also perform the aforementioned compressing and formatting functions. Preferably, a compression and formatting algorithm such as the "PCL-TIFF" (Printer Control Language—Tagged Image Format File) algorithm is employed, and the printing device 14 is programmed to decompress the formatted data according to the PCL-TIFF algorithm. However, it will be recognized that other compression and formatting algorithms may be employed without departing from the spirit and scope of the present invention.

Referring now to FIG. 2, the components of the PDI 36 are shown, with command paths and data paths between the components respectively shown by lighter and heavier lines. As can be seen, the PDI 36 includes a database 40 for storing document and page information. More specifically, the database 40 stores document information for each document that is being printed or that is awaiting printing and page information for each page of each document that is being printed or that is awaiting printing. As should be understood, then, the system 10 may be employed to queue up several documents to be printed, each document having several pages.

Figure 3:
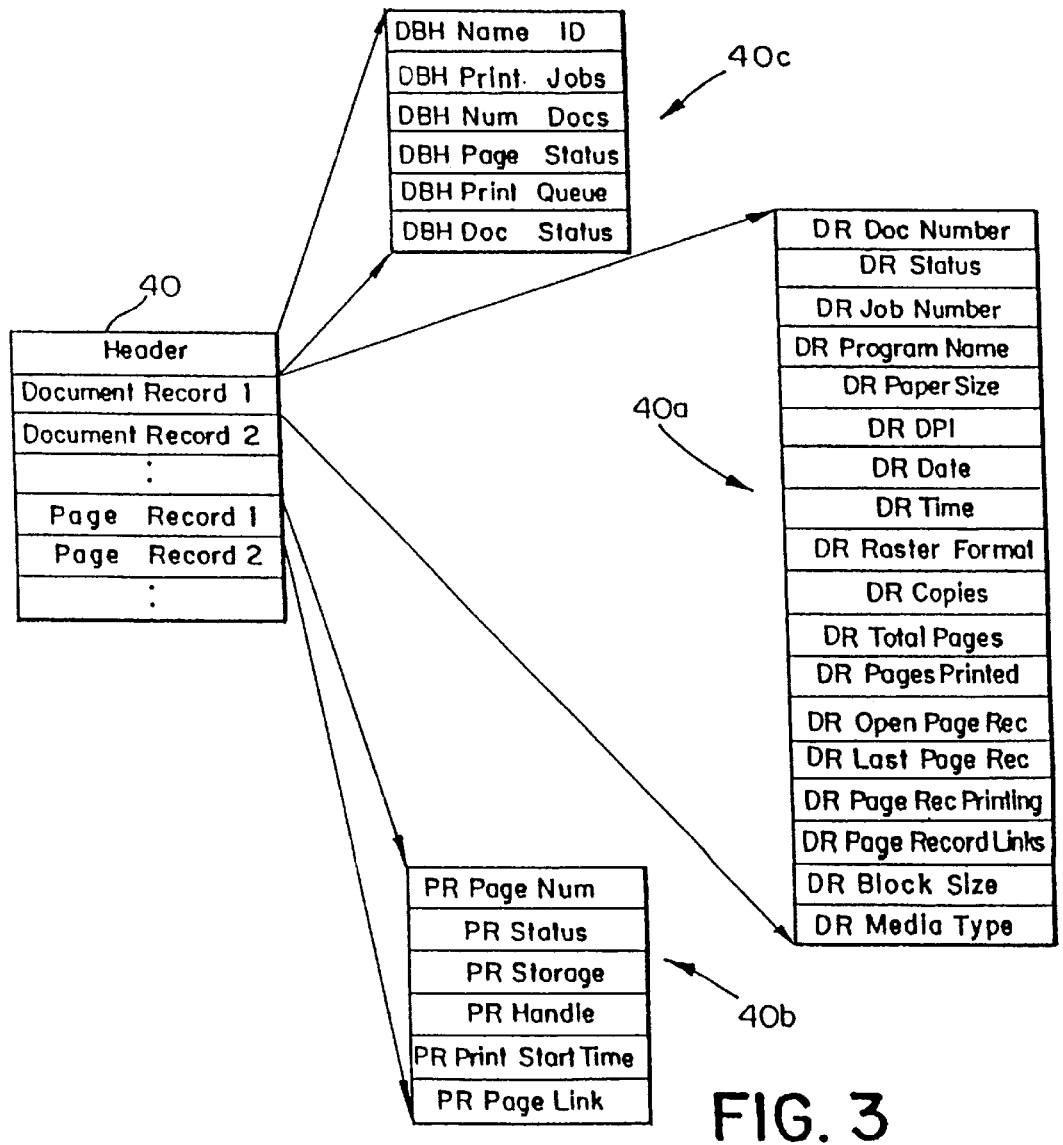
FIG. 3 is a schematic diagram showing, in greater detail, the structure of a preferred embodiment of the database of the PDI shown in FIG. 2.

Referring now to FIG. 3, it may be seen that the database 40 has one or more document records 40*a*, one or more page records 40*b*, and a header 40*c*. Each document record 40*a* represents one document that is being printed or that is awaiting printing, and may contain such information as a document number assigned to the document by the system 10, the printing status of the document, the computer application 28 from which the document originated, the size of paper on which the document is to be printed, the DPI or printing resolution requested for the document, the date and time the document was ordered to be printed, the number of copies of the document to be printed, the total number of pages in the document, a running count of the number of pages printed, the raster format of the document, and linking information for each of the page records 40*b* associated with the particular document record 40*a*, among other things.

Similarly, each page record 40*b* in the database 40 represents one page of a document that is being printed or that is awaiting printing, and may include such information as a page number assigned to the page by the computer application 28, the status of the page, where in the system memory 18 the page is stored, an identifier assigned to the page record by the system 10, and linking information with regard to the particular document record 40*a* associated with the page record 40*b*, among other things. The header 40*c* contains information pertaining to the database 40 and the system 10, including an identifier assigned to the database 40 by the system 10, the number of documents in the print queue, the status of each of the pages, the number of document records available, and the number of page records available, among other things. Of course, it will be recognized that other information may be stored in each document and page record 40a, 40b and in the header 40c without departing from the spirit and scope of the present invention.

Referring again to FIG. 2, it will be seen that the database 40 receives and provides access to data by way of a Protected Mode/Virtual Mode 86 (PM/V86) component 42. As will be recognized, and with particular reference to the "WINDOWS" operating system, the PM/V86 component 42 is employed to interpret whether the operating system is operating in the protected mode or the virtual mode. As should be understood, such information is necessary to map addressable system memory locations. If the system 10 is being operated in connection with an operating system other than the "WINDOWS" operating system, the PM/V86 component 42 may be unnecessary or may be replaced with an equivalent component, as the case may be.

The PDI 36 has a print controller component 44 in communication with the database 40 to determine from the database 40 whether any pages are output-ready. As should be evident, a page is output-ready when the bitmap data for that page has been produced and the bitmap data has been compressed, formatted and stored in the system memory 18 as output-ready data. Preferably, the print controller 44 checks the database 40 at regular intervals of about one to two seconds for any output-ready pages. The PDI 36 may include a print controller timer 46 to provide the print controller 44 with a time reference for checking the database 40.

When an output-ready page is found, the print controller 44 determines an amount of the virtual memory 26 necessary to process the output-ready data for the page and. the amount of available physical and virtual memory 24, 26. If the amount of available physical memory 24 is more than that necessary to hold the output-ready data for the entire page, the print controller 44 locks all of the output-ready data into the available physical memory 24. If the amount of available physical memory 24 is less than that necessary to hold the output-ready data for the entire page, the print controller 44 locks a beginning portion of the output-ready data into the available physical memory 24. As should be recognized, locking data ensures that the data is in physical memory 24, and causes the multi-tasking operating system to move or "swap" the data from the non-physical portion of the virtual memory 26 to the physical memory 24 if the data is not already in the physical memory 24. Similarly, unlocking locked data allows the multi-tasking operating system to swap the previously locked data to the non-physical portion of the virtual memory 26 if the physical memory 24 is needed for other data.

Once the print controller 44 has locked at least the beginning portion of the output-ready data into the physical memory 24, a port handler component 48 in communication with the print controller 44 receives instructions from the print controller 44 to transfer the output-ready data for the page in the physical memory 24 to the printing device 14 by way of the interface 16. If some portion of the output-ready data was not previously locked into physical memory 24 by the print controller 44, the port handler 48 unlocks the locked physical memory 24 and locks subsequent portions of the output-ready data for the page into physical memory 24.

The port handler 48 sends predetermined size blocks of data from the physical memory 24 to the printing device 14 at intervals set by a port handler timer 50. In particular, the port handler 48 sequentially places each piece of data for a given block on the interface 16 and toggles the appropriate control lines of the interface 16 at appropriate times to notify the printing device 14 that the data is present and can be accepted. Preferably, the port handler 48 sends data according to the Compatibility and ECP modes defined by the IEEE-P1284 Standard. As is known, the ECP mode requires special ECP circuit chips in the computer 12 and the printing device 14. As an enhancement to the Compatibility mode, the port handler 48 preferably also sends data in a burst mode wherein a block of data is sent without an acknowledgment from the printing device 14 that each piece of data has been received.

In addition to sending data, the port handler 48 receives data from the printing device 14. Such received data preferably pertains to the functioning of the printing device 14, and may include information such as whether the printing device 14 is ready to accept data, whether a page of data has been successfully printed, whether the printing device 14 is unavailable for printing, why the printing device 14 is unavailable, and the like. To receive such information, the port handler 48 and the interface 16 are operated in the ECP mode or in a Nibble mode, as also defined by the IEEE-P1284 Standard.

Preferably, the port handler 48 sends a block of the output-ready data to the printing device 14, reads a status port on the interface 16 for status information, and provides the status information to a status monitor 54 within the port handler 48. Also preferably, the port handler 48 continues to read the status port and provide status information to the status monitor 54 after all available output-ready data has been sent to the printing device 14. Accordingly, the print controller 44 can regularly check the status monitor 54 for a message that a page has been successfully printed, and can update the database 40 accordingly.

Preferably, the port handler 48 is also employed to transfer printing device control commands from the print controller 44 to the printing device 14. Such printing device control commands may include but are not limited to the particular type of paper the data is to be printed upon, the printing resolution requested for the printed data, and the like. Additionally, the printing device control commands may include commands from the operator panel 52 (as seen in FIG. 1) associated with the system 10. Accordingly, a user of the system 10 may instruct the printing device 14 through the operator panel 52 to change the printing resolution, to reset, to enter a cleaning mode, and the like.

The PDI 36 also includes a communications module or post office 56 for communicating messages between the PDI 36 and the computer application 28, as well as with a system monitor 58 (as seen in FIG. 1) by way of a software interrupt component 60. Accordingly, the post office 56 may be employed to communicate a message from the printing device 14 by way of the status monitor 54, the port handler 48, and the print controller 44 to a computer application 28 that the application should resend a page. Similarly, the post office 56 may be employed to notify a user of the system 10 by way of a system monitor 58 that the printing device 14 requires servicing.

Once the output-ready data for a page has been successfully transmitted to the printing device 14, and the printing device 14 has acknowledged that the page has been successfully printed, the print controller 44 preferably releases the page by sending a message to the database 40 to delete the associated page record 40b, By releasing the page, the system memory 18 associated with the page is freed to be used by other resources. Similarly, when a document is successfully printed, the print controller 44 preferably releases the document by sending a message to the database 40 to delete the associated document record 40a.

Preferably, the print controller 44 waits until after the printed page exits the printing device 14 to release the page. Accordingly, if the print controller 44 detects from the status monitor 54 that a print error has occurred, the print controller 44 can cancel the release of the page and send a message by way of the post office 56 to the system monitor 58 to inform a user of the system 10 that a print error has occurred. As a result, the user may attempt to rectify the problem and have the affected page reprinted from the output-ready data for the page still stored in the system memory 18.

As is known, many computer applications 62 are designed to run in connection with a single-task operating system such as the "MS-DOS" operating system or the like. For example, if the "MS-DOS" operating system is employed in connection with the present invention, the computer application 62 may be the "WORDPERFECT FOR MS-DOS" word processing application. As should be understood, a single-task operating system may perform only one function at a time.

A computer application 62 running on the "MS-DOS" operating system normally directs print data to a computer output port such as LPT1: or LPT2:, and the print data is encoded in one of several well-known printer control languages (PCLs) or page description languages (PDLs). Thus, and as was described above, a printer attached to the computer output port is expected to receive the encoded print data, rasterize the received data, and print the rasterized data. However, a problem arises in connection with the system 10 of the present invention in that the printing device 14 used in connection with the present invention expects to receive data that has already been rasterized. Accordingly, the printing device 14 is not able to understand or rasterize the encoded data produced by the computer application 62 running on the "MS-DOS" operating system.

To resolve the aforementioned problem in connection with the system 10 of the present invention, it is preferable that the computer 12 be arranged such that the single-task operating system run as a portion of the multi-tasking operating system, as is an option in the "WINDOWS" operating system. Thus, the computer application 62 operated in connection with the single-task ("MS-DOS") operating system is also operating in connection with the multi-tasking ("WINDOWS") operating system.

However, the computer application 62 in such an arrangement still directs print data to a computer output port such as LPT1: or LPT2:. Accordingly, it is preferable that the PDI 36 of the present invention have an I/O trap or port trap 64 (shown in FIG. 2). As is known, the I/O trap 64 diverts the print data away from the computer output port and stores the data in the system memory 18.

After the print data is trapped and stored, the stored data is retrieved and rasterized by a printer control language raster image processor (PCL-RIP) 66 (as seen in FIG. 1). As should be understood, the PCL-RIP 66 operates in a manner similar to the operation of the rasterizer 32, except that the PCL-RIP 66 is constructed and programmed to rasterize the encoded diverted print data. Preferably, the PCL-RIP 66 rasterizes the diverted print data to produce bitmap data, stores the bitmap data in the system memory 18, and interfaces to the PDI 36 similar to the bitmap driver 34.

When the PDI 36 receives a print command from the PCL-RIP 66, the PDI retrieves output-ready data from the system memory 18. As described above, the output-ready data is derived from the rasterized print data by formatting and compressing the rasterized print data. Preferably, the PCL-RIP 66 performs the formatting and compressing functions, although it will be recognized that the PDI 36 may also perform such functions. The output-ready data retrieved from the system memory 18 by the PDI 36 is then sent to the printing device 14 in the same manner as described above.

Preferably, the system 10 also includes a job control component 68. As should be understood, the job control 68 is employed to access the data in the database 40 within the PDI 36 to determine the status of print jobs already queued. Accordingly, a user may employ the job control 68 to add, delete, or edit a particular print job, rearrange the order of several print jobs, and the like.

With the system 10 as described above, a document is printed at the direction of a user of the computer application 28. The document may consist of one or more pages, although it will only be necessary to describe the process for printing a single page.

When a user operates a computer application 28 in connection with the multi-tasking operating system and directs the computer application 28 to print a document, the computer application 28 produces system graphics resources print data corresponding to a page of the document (as seen at step 401 in FIG. 4). Concurrently, system graphics resources 30 including the rasterizer 32 in the system 10 are being operated in connection with the multi-tasking operating system, and the rasterizer 32 is being provided with the printing device parameters (step 403). The rasterizer 32 rasterizes the system graphics resources print data according to the printing device parameters and produces bitmap data corresponding to the page (step 405), output-ready data is derived from the bitmap data (step 407), and the output-ready data is sent to the printing device 14 by way of the PDI 36 (step 409).

Figure 10:
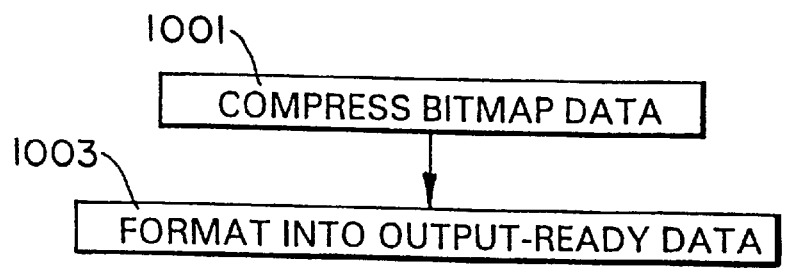

As discussed above, the deriving of the output-ready data from the bitmap data includes compressing the bitmap data for a rasterized page into compressed data (step 1001 as seen in FIG. 10) and formatting the compressed data into the output-ready data (step 1003). Preferably, the bitmap data is compressed and formatted one row of pixels at a time, such that when the printing device 14 receives and decompresses the output-ready data, a series of zeroes and ones representing off and on pixels for a print line may be forwarded directly to the print engine within the printing device 14.

Figure 5:
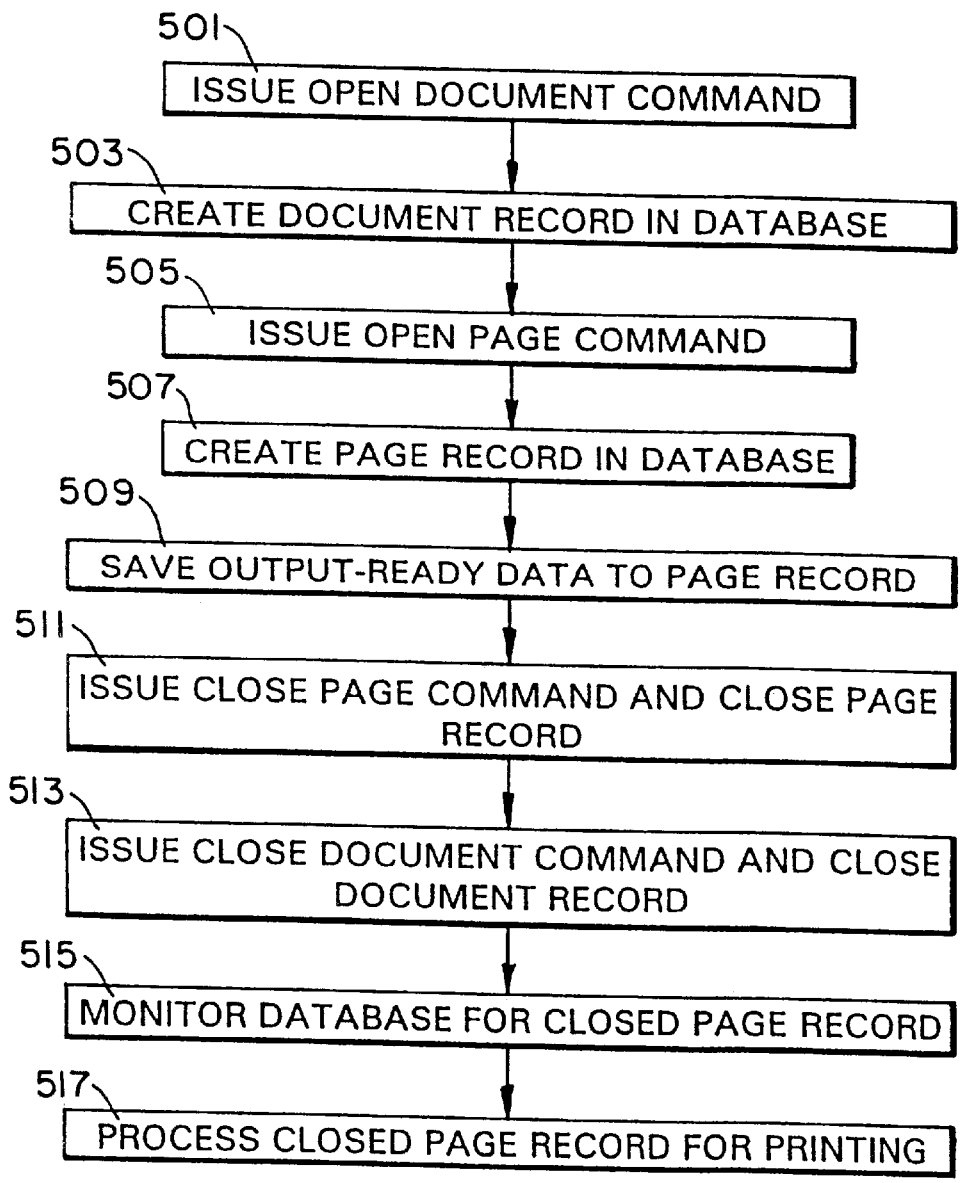

Before the rasterizer 32 creates bitmap data for the first page of the document, the rasterizer 32 causes the bitmap driver 34 to issue an open document command to the PDI 36 (as seen in FIG. 5 at step 501). The open document command and other similar commands are preferably routed to the PDI 36 by way of the bitmap driver 34 and the DLL 38. In response to the open document command, a document record 40a is created in the database 40 within the PDI 36 (step 503), and document information relating to the document is stored in the document record 48.

Similarly, before the rasterizer 32 creates bitmap data for any page of the document, a page record 40b for the page must be created in the database 40 within the PDI 36. Accordingly, the rasterizer 32 causes the bitmap driver 34 to issue an open page command to the PDI 36 (step 505), preferably by way of the same route as the open document command of step 501. In response to the open page command, a page record 40b is created in the database 40 within the PDI 36 (step 507), and information relating to the page is stored in the page record 40b.

Once a document record 40*a* for the document and a page record 40*b* for the page are created in the database 40, the bitmap data for the page may be produced and the output-ready data for the page may be derived according to steps 405 and 407 of FIG. 4, and the output-ready data can be saved to the page record 40*b* (step 509). As may be recognized, the page record does not actually hold the output-ready data, but rather maintains information relating to where the output-ready data is stored.

When all the output-ready data for the page is saved to the page record 40*b*, the rasterizer 32 causes the bitmap driver 34 to issue a close page command to the PDI 36, and the page record 40*b* is closed (step 511). Similarly, once all the pages for a document are completed and the corresponding page records 40*b* are closed, the rasterizer 32 causes the bitmap driver 34 to issue a close document command to the PDI 36 and the PDI 36 closes the document record 40*a* (step 513). At regular intervals, the print controller 44 monitors the database 40 to determine whether any closed page records 40*b* exist (step 515), and if any closed page records 40*b* are found, the closed page(s) are processed for printing (step 517).

The print controller 44 prepares the output-ready data for a page to be transferred to the printing device 14 by the port handler 48. More particularly, the print controller 44 locks at least a portion of the output-ready data into available physical memory 24 and notifies the port handler 48 that data is ready to be transferred. As seen in FIG. 8, after a document record 40*a* corresponding to the document and a page record 40*b* corresponding to the page have been created in the database 40 within the PDI 36 (step 801), and after the page record 40*b* has been updated to reflect that the page is output ready (step 803), the page record is updated to reflect the amount of the system memory 18 necessary to process the output-ready data for the page (step 805). As should be understood, the amount of system memory 18 necessary is determined by reference to the multi-tasking operating system, which has such information.

Thereafter, the print controller 44 determines from the page record 40*b* that the page is output ready, and also determines the amount of system memory 18 necessary to process the output-ready data for the page (step 807). Additionally, the print controller 44 determines the amount of available physical and virtual memory 24, 26 and whether the available physical memory 24 exceeds the amount necessary to process the output-ready data for the page (step 809).

With the aforementioned information, the print controller 44 then causes at least a portion of the output-ready data for the page to be locked into the available physical memory 24 (step 811), and the port handler 48 causes the locked output-ready data to be transferred to the printing device 14 by way of the interface 16 (step 813). Once the printing device 14 receives all the output-ready data for a page, the printing device 14 sends a message to be received by the status monitor 54 within the port handler 48, the print controller 44 reads the status monitor 54 to access the message, and the print controller 44 updates the database 40 to reflect that all the output-ready data has been received (step 815). The printing device 14 may also send other messages before all the output-ready data for a page has been transferred. Such other message include messages concerning the status of the printer and a condition of the printer requiring immediate attention, among other things.

The print controller 44 determines whether all or a portion of the output-ready data can be locked into the physical memory 24 by determining the quantity of available physical memory 24 and the quantity of physical memory 24 necessary to hold all the output-ready data (step 701 of FIG. 7) and whether the quantity of available physical memory 24 is sufficient, i.e. greater than the quantity of physical memory 24 necessary to hold all the output-ready data (step 703). If the quantity of available physical memory 24 is sufficient, the print controller 44 locks all the output-ready data into the physical memory 24 (step 705) and the port handler transfers the output-ready data from the physical memory 24 to the printing device 14 (step 707).

If the quantity of available physical memory 24 is not sufficient, the print controller 44 locks a beginning portion of the output-ready data into the available physical memory 24 (step 709) and the port handler 48 transfers the beginning portion of the output-ready data from the physical memory 24 to the printing device 14 (step 711). Thereafter, the port handler 48 unlocks at least a segment of the output-ready data after the segment has been transferred (step 713). As may be recognized, the unlocking of the segment creates available physical memory 24, and the port handler may then lock a subsequent portion of the output-ready data into the available physical memory 24 (step 715), and transfer the subsequent portion of the output-ready data from the physical memory 24 to the printing device 14 (step 717). The port handler 48 repeats the aforementioned unlocking, locking, and transferring steps as necessary until all of the output-ready data is transferred to the printing device 14 (step 719).

As may be recognized, a situation may arise where no physical memory 24 is available to process the output-ready data for the page. In anticipation of such a situation, the system 10 preferably reserves a predetermined size portion of physical memory 24 as a buffer 70 to be used only as a last resort. Thus, when no other physical memory 24 is available, the print controller 44 places a beginning portion of the output-ready data in the buffer 70 and the port handler 48 proceeds as described above.

To transfer the output-ready data to the printing device 14, the port handler 48 is provided with the port handler timer 46, and the port handler timer 46 is set to have an output with a preselected rate or interval (step 601 of FIG. 6). Accordingly, during each preselected interval, the port handler 44 retrieves a predetermined-size block oa the output-ready data for the page and sends the block of the output-ready data to the printing device 14. Each block of the output-ready data is sent in a sequential fashion until all of the output-ready data for the page is sent (step 603). Thereafter, the page record 40*b* is updated by the print controller 44 to reflect that the page has been sent (step 605).

As should be understood, the preselected interval is determined such that the port handler 48 sends the data at a rate greater than a minimum rate determined according to printing parameters such as paper size, engine speed, and printing resolution. Preferably, the printing device 14 and/or the computer 12 has a flow control mechanism (not shown) that indicates to the port handler 48 when the printing device 14 does not have enough free memory to receive a block of data. When such a situation arises, it is preferable that the port handler 48 wait at least one interval of the port handler timer 46 to send data. Thus, the memory of the printing device 14 can accommodate the flow of data, and the print engine of the printing device 14 has data as needed.

When the system 10 is operating to print data from an application 62 operating in connection with a single-task operating system, the I/O trap 64 causes the encoded print data from the computer application 62 to be diverted away from the computer output port and stored in the system memory 18 (as seen in FIG. 9 at step 901). The PCL-RIP 66 is then operated to rasterize the diverted print data, and to store the rasterized print data in the system memory 18 (step 903).

Thereafter, output-ready print data is derived from the rasterized print data (step 905) by compressing the data into compressed data and formatting the compressed data into the output-ready data (as seen at steps 1001 and 1003 of FIG. 10). The PDI 36 is then employed to send the output-ready print data to the printing device 14 (step 907, in the same manner as described above.

From the foregoing description, it can be seen that the present invention comprises a new and useful host based printing system and method for printing pages of information from a computer application. It will be appreciated by those skilled in the art that changes could be made to the embodiment described above without departing. from the broad inventive concepts thereof. It is understood, therefore, that this invention is not limited to the particular embodiment disclosed, but it is intended to cover modifications within the spirit and scope of the present invention as defined by the appended claims.

We claim:

1. A method for printing a document having at least one page in a host based printing system, the printing system including a rasterized-image printing device and a computer communicatively coupled to the printing device, the computer having a printing device interface (PDI) and a multi-tasking operating system, and the printing device having a plurality of preselected printing device parameters, the method comprising the steps of:

operating a resident computer application in connection with the multi-tasking operating system and causing the computer application to produce system graphics resources print data corresponding to each page;

operating system graphics resources including a rasterizer in connection with the multi-tasking operating system;

providing the rasterizer with the printing device parameters;

rasterizing the system graphics resources print data in the rasterizer according to the printing device parameters to produce bitmap data corresponding to each page;

deriving output-ready data from the bitmap data;

operating the printer device interface (PDI) in connection with the multi-tasking operating system and temporarily storing in the PDI, a page record for each page to be printed; and sending the output-ready data to the printing device via the PDI.

2. The method of claim 1 further including the steps of:

issuing an open document command to the PDI;

creating a document record in a database within the PDI in response to the open document command, the document record for holding document information relating to the document;

issuing an open page command to the PDI;

creating a page record in the database within the PDI in response to the open page command, the page record for holding page information relating to the page;

saving the output-ready data to the page record;

issuing a close page command to the PDI after the bitmap data corresponding to the page is produced and closing the page record;

issuing a close document command to the PDI after the page record is closed and closing the document record;

monitoring the database within the PDI for a closed page record; and processing the closed page record for printing.

3. The method of claim 2 wherein the processing step comprises the steps of:

providing a timer having a preselected interval;

sending a portion of the output-ready data during each preselected interval in a sequential fashion until all of the output-ready data is sent; and updating the page record to indicate that the page has been sent.

4. The method of claim 2 wherein the computer has a determinable quantity of physical memory available, the processing step including the steps of:

determining that the quantity of physical memory available is greater than a quantity necessary to hold the output-ready data; and locking the output-ready data into the physical memory;

the sending of the output-ready data to the printing device via the PDI comprising transferring the output-ready data from the physical memory to the printing device.

5. The method of claim 2 wherein the computer has a determinable quantity of physical memory available and a determinable quantity of virtual memory available, the processing step including the steps of:

determining that the quantity of physical memory available is less than a quantity necessary to hold the output-ready data; and locking a beginning portion of the output-ready data into the available physical memory;

the sending of the output-ready data to the printing device via the PDI comprising the steps of:

transferring the beginning portion of the output-ready data in the physical memory to the printing device;

unlocking at least a segment of the locked output-ready data after the segment has been transferred;

locking a subsequent portion of the output-ready data into the available physical memory;

transferring the subsequent portion of the output-ready data in the physical memory to the printing device; and repeating the unlocking, locking, and transferring steps as necessary, until all of the output-ready data is transferred to the printing-device.

6. The method of claim 1 wherein the step of deriving output-ready data from the bitmap data comprises the steps of compressing the bitmap data into compressed data and formatting the compressed data into the output-ready data.

7. The method of claim 1 wherein the computer further has system memory including an amount of available physical memory, the method further comprising the steps of:

creating a page record corresponding to the page and a document record corresponding to the document in a database in the PDI;

updating the page record when the page is output-ready;

updating the page record with an amount of the system memory necessary to process the output-ready data for the page;

determining from the page record whether the page is output-ready and an amount of the system memory necessary to process the output-ready data for the page;

determining the amount of available physical memory;

locking at least a portion of the output-ready data into the available physical memory; and transferring the locked output-ready data in the available physical memory to the printing device.

8. The method of claim 7 further comprising the steps of receiving messages from the printing device and updating the database according to the messages.

9. The method of claim 7 wherein the computer has a single-task operating system running as a portion of the multi-tasking operating system, the computer further including a second resident computer application being operated in connection with the single-task operating system to produce print data corresponding to the page, the print data being directed by the second application to a computer output port, the method further comprising the steps of:

diverting the print data away from the computer output port;

operating a second rasterizer in connection with the single-task operating system;

rasterizing the diverted print data in the second rasterizer and storing the rasterized print data in the system memory;

deriving output-ready print data from the rasterized print data; and sending the output-ready print data to the printing device via the PDI.

* * * * *